(12) United States Patent
Priel et al.

(10) Patent No.: US 8,381,009 B2
(45) Date of Patent: Feb. 19, 2013

(54) DEVICE AND METHOD FOR POWER MANAGEMENT

(75) Inventors: Michael Priel, Hertzelia (IL); Dan Kuzmin, Givat Shmuel (IL); Anton Rozen, Gedera (IL)

(73) Assignee: Freescale Semiconductor, Inc., Austin, TX (US)

( * ) Notice: Subject to any disclaimer, the term of this patent is extended or adjusted under 35 U.S.C. 154(b) by 878 days.

(21) Appl. No.: 12/376,074

(22) PCT Filed: Aug. 3, 2006

(86) PCT No.: PCT/IB2006/052671
§ 371 (c)(1),
(2), (4) Date: Feb. 2, 2009

(87) PCT Pub. No.: WO2008/015495
PCT Pub. Date: Feb. 7, 2008

(65) Prior Publication Data
US 2010/0019818 A1     Jan. 28, 2010

(51) Int. Cl.
*G06F 1/12* (2006.01)
(52) U.S. Cl. .................................. 713/401; 713/503
(58) Field of Classification Search .................. 713/400, 713/401, 500–503; 327/199–203, 205–214, 327/224, 225
See application file for complete search history.

(56) References Cited

U.S. PATENT DOCUMENTS

| | | | |
|---|---|---|---|
| 5,233,617 A | 8/1993 | Simmons et al. | |
| 6,025,744 A * | 2/2000 | Bertolet et al. | 327/276 |
| 6,108,794 A * | 8/2000 | Erickson | 713/401 |
| 6,169,419 B1 | 1/2001 | De et al. | |
| 6,300,809 B1 | 10/2001 | Gregor et al. | |
| 7,142,623 B2 * | 11/2006 | Sorna | 375/376 |
| 7,310,755 B2 | 12/2007 | Mudge et al. | |
| 7,320,091 B2 * | 1/2008 | Blaauw et al. | 714/30 |
| 7,337,356 B2 * | 2/2008 | Mudge et al. | 714/10 |
| 7,650,551 B2 * | 1/2010 | Flautner et al. | 714/731 |
| 2004/0008056 A1 | 1/2004 | Kursun et al. | |
| 2005/0229059 A1 | 10/2005 | Hirano | |
| 2010/0244937 A1 * | 9/2010 | Anidjar et al. | 327/538 |

FOREIGN PATENT DOCUMENTS

| | | |
|---|---|---|
| GB | 2404055 A | 1/2005 |
| WO | 2006056824 A | 6/2006 |
| WO | 2008015494 A1 | 2/2008 |

OTHER PUBLICATIONS

Kaul et al; "DVS for on-chip bus designs based on timing error correction"; IEEE, Proceedings of the Design, Automation, and Test in Europe Conference and Exhibition, Dec. 2005.
Ernst et al; "Razor: A low power pipeline based on circuit-level timing speculation"; IEEE 36th Annual International Symposium on Microarchitecture, Dec. 2003.
U.S. Appl. No. 12/376,071, Non-final Office Action mailed Jun. 29, 2010, 11 pages.

* cited by examiner

*Primary Examiner* — Khanh Dang (57) ABSTRACT

A device having power management capabilities and a method for power management, the method includes: providing a clock signal and a supply voltage to at least one component of a device; detecting a timing error; delaying by a fraction of a clock cycle and in response to the detected timing error, a clock signal provided to at least one of the components; and determining a clock signal frequency and a level of the supply voltage in response to at least one detected timing error.

20 Claims, 9 Drawing Sheets

Flip Flop 10   Prior art
FIG. 1

FIG. 2

Prior art

DEVICE AND METHOD FOR POWER MANAGEMENT

FIELD OF THE INVENTION

The present invention relates to devices that have power management capabilities and to methods for power management.

BACKGROUND OF THE INVENTION

Mobile devices or devices, such as but not limited to personal data appliances, cellular phones, radios, pagers, lap top computers, and the like are required to operate for relatively long periods before being recharged. These mobile devices usually include one or more processors as well as multiple memory modules and other peripheral devices.

The power consumption of a transistor-based device is highly influenced by leakage currents that flow through the transistor. The leakage current is responsive to various parameters including the threshold voltage (Vt) of the transistor, the temperature of the transistor, supply voltage and the like. Transistors that have higher Vt are relatively slower but have lower leakage currents while transistors that have lower Vt are relatively faster but have higher leakage current.

In order to reduce the power consumption of mobile devices various power consumption control techniques were suggested. A first technique uses domino circuits that include both high threshold voltage transistors and low threshold voltage transistors. U.S. patent application number 2004/0008056 of Kursun et al., which is incorporated herein by reference, discloses a domino circuit that is configured such as to reduce power consumption, for example by limiting the energy consumed during power switching.

Yet another technique is based upon creating a stack effect that involves shutting down multiple transistors of the same type that are serially connected to each other. U.S. Pat. No. 6,169,419 of De et al., which is incorporated herein by reference, discloses a method and apparatus for reducing standby leakage current using a transistor stack effect. De describes a logic that has both a pull up path and a pull down path.

A further technique includes reducing the clock frequency of the mobile device. Yet a further technique is known as dynamic voltage scaling (DVS) or alternatively is known as dynamic voltage and frequency scaling (DVFS) and includes altering the voltage that is supplied to a processor as well as altering the frequency of a clock signal that is provided to the processor in response to the computational load demands (also referred to as throughput) of the processor. Higher voltage levels are associated with higher operating frequencies and higher computational load but are also associated with higher energy consumption.

Very aggressive DVS techniques are illustrated in "DVS for On-Chip Bus Designs Based On Timing Error Correction", H. Kaul, D. Sylvester, D. Blaauw, T. Mudge and T. Austin, Proceedings of the Design, Automation and Test in Europe Conference and Exhibition (DATE'05) and "Razor: A Low Power Pipeline Based on Circuit-Level Timing Speculation", D. Ernst, N. S. Kim, S. Das, S. Pant, R. Rao, T. Pham, C. Ziesler, D. Blaauw, T. Austin, K. Flautner and T. Mudge, 36TH Annual International Symposium on Microarchitecture (MICRO-36), December 2003. These aggressive DVS technique are based upon the assumption that power savings can be increased if the supplied voltage level (and clock signal frequency) will be responsive to error occurring in a circuit and not be responsive to the voltage level (and clock signal frequency) that should be supplied to a theoretical circuit that is characterized by worst-case scenarios of environment and process variations. In a nutshell the supplied voltage level (and clock frequency) are lowered until error are being detected. It is noted that the error rate dramatically increases when the voltage level decreases below a certain voltage level.

Figure 1:
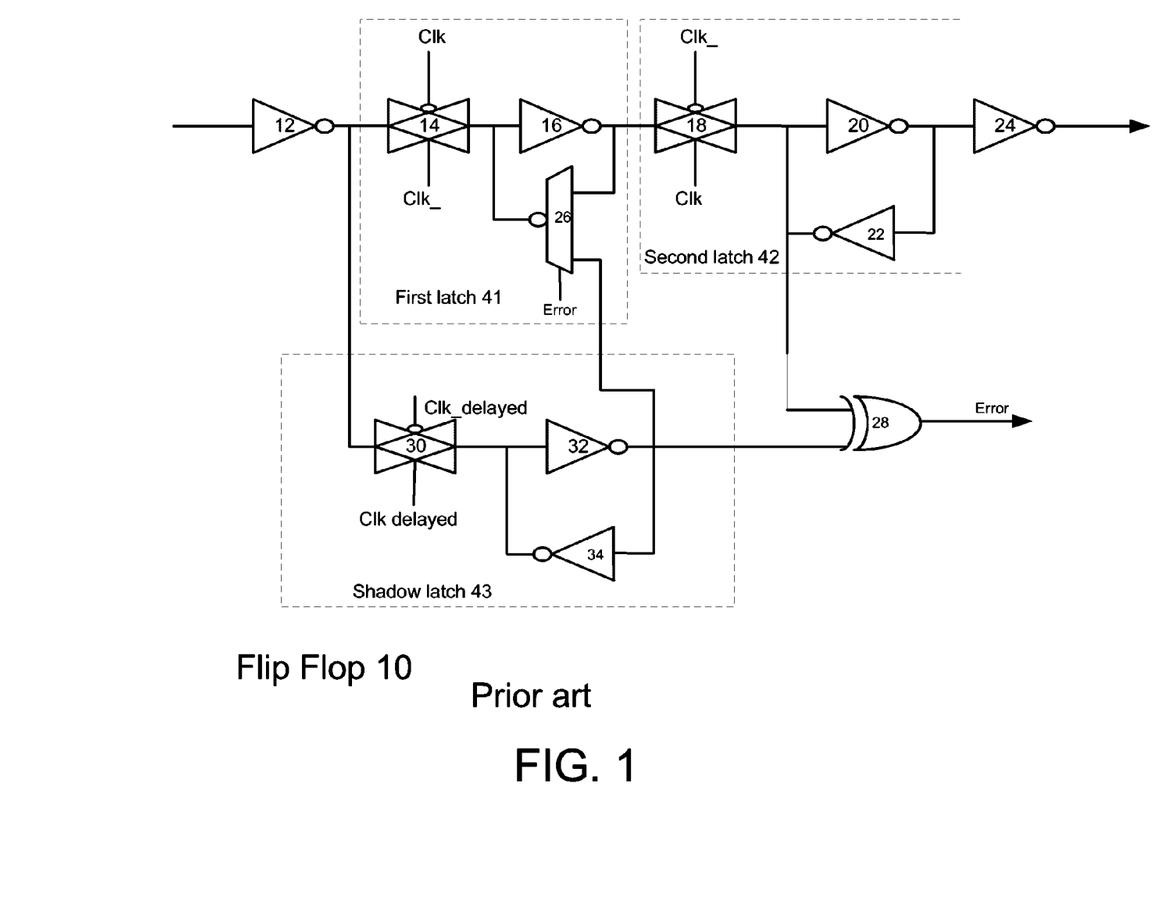
FIG. 1 illustrates a prior art flip-flop.
Figure 2:
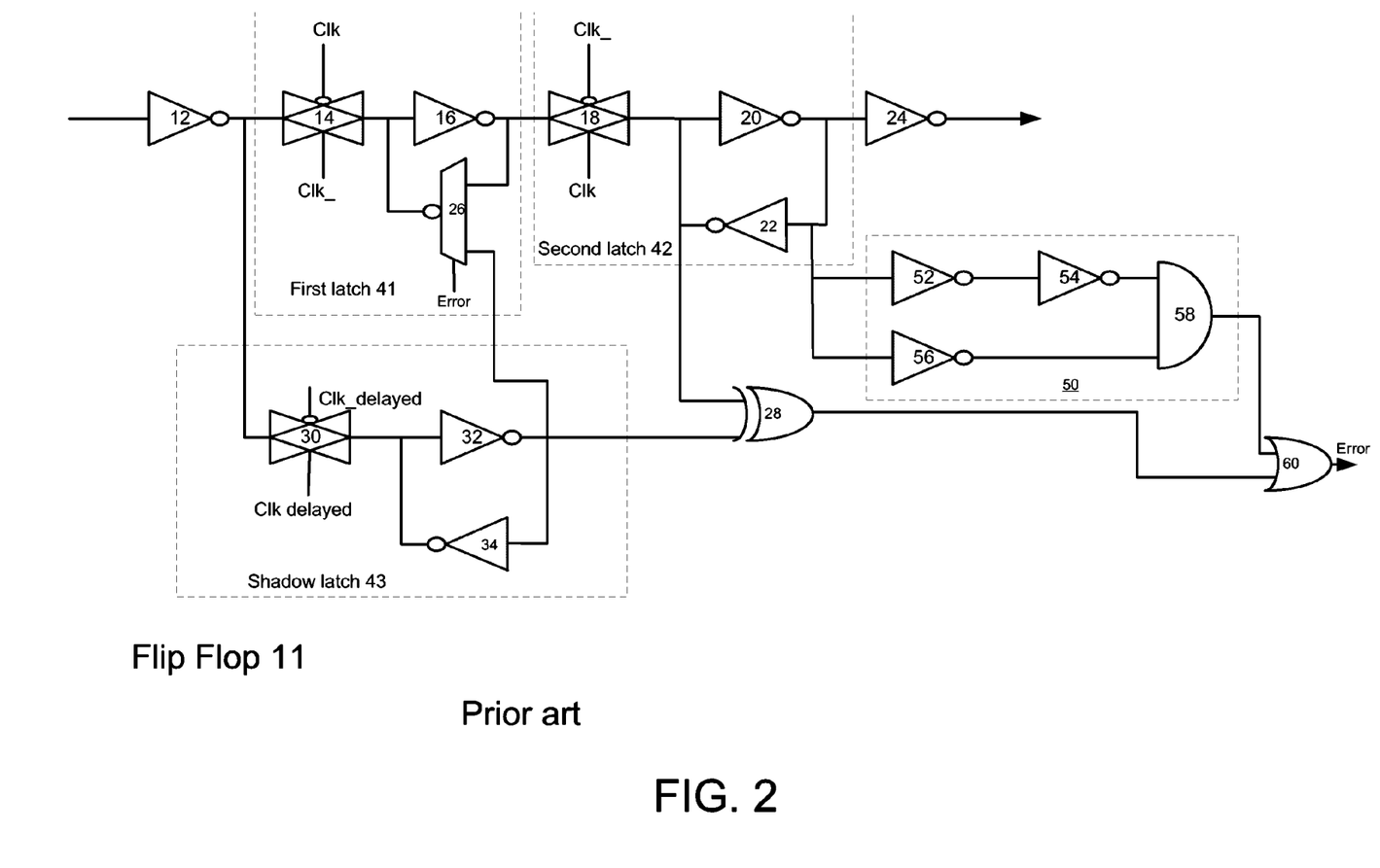
FIG. 2 illustrates a prior art flip-flop.

FIG. 1 illustrates a prior art flip-flop 10 as illustrated in the first article while FIG. 2 illustrates a prior art flip-flop 11 as illustrated in the second article. Prior art flip-flop 11 differs from prior art flip-flop 10 by including a meta-stable detector 50 and an additional logical gate 60 that is connected to the output of the meta-stable detector 50 and to comparator 28 that compares the output of first latch 41 and shadow latch 43.

Flip-flop 10 includes input inverter 12, output inverter 24, first latch 41, second latch 42, shadow latch 43 and comparator 28. The first and second latches 41 and 42 are serially connected to each other. The outputs of second transfer gate 18 and shadow latch 43 are connected to inputs of comparator 28. The output of comparator 28 generates an error indication Error. First latch 41 includes first transfer gate 14 that is serially connected to first inverter 16. The output of first inverter 16 is connected to a first input of first multiplexer 26. Another input of first multiplexer 26 is connected to an output of shadow latch 43. First multiplexer 26 is controlled by Error and its output is connected to the input of first inverter 16. Second latch 42 includes second transfer gate 18 followed by a pair of inversely connected second and third inverters 20 and 22. The output of second latch 42 is connected to an input of output latch 24. The output of second transfer gate 18 is connected to an input of comparator 28.

The input of first transfer gate 14 and of shadow transfer gate 30 are connected to an output of input inverter 12. First transfer gate 14 is clocked by a clock signal (Clk) and shadow transfer gate 30 is clocked by a delayed clock signal (Clk_delayed). Second transfer gate 18 of second latch 42 is clocked by an inverted clock signal (Clk_inv). Accordingly, first latch 41 latches data at the rising edge of Clk, second latch 42 latches data at the falling edge of Clk and shadow latch 43 latches data at a certain delay (usually slightly before the falling edge of Clk) from the rising edge of Clk.

Prior art flip-flop 11 further includes a meta-stable detector 50 that is connected to the output of second latch 42 and its output is connected to a first input of or gate 60. The other input of OR gate 60 is connected to the output of comparator 28. The output of OR gate 60 provided error signal Error.

Meta-stable detector 50 includes fourth till sixth inverters 52, 54 and 56 and an AND logic gate 58. The output of second latch 42 is connected to the inputs of fourth and sixth inverters 52 and 56. The output of sixth inverter 56 is connected to an input of AND logic gate 58. The fifth inverter 54 is connected between the AND logic gate 58 and the fourth inverter 52.

Both flip-flops 10 and 11 perform error detection by comparing between data stored at shadow latch 43 and data stored at first latch 41, wherein the comparison occurs at the falling edge (after 50% of the clock cycle) of the clock cycle. Accordingly, only a small portion of the clock cycle is allocated for error detection propagation.

In addition, error recovery takes another clock cycle and data stored at shadow latch 43 is sent to first latch 41 via first multiplexer 26.

Figure 3:
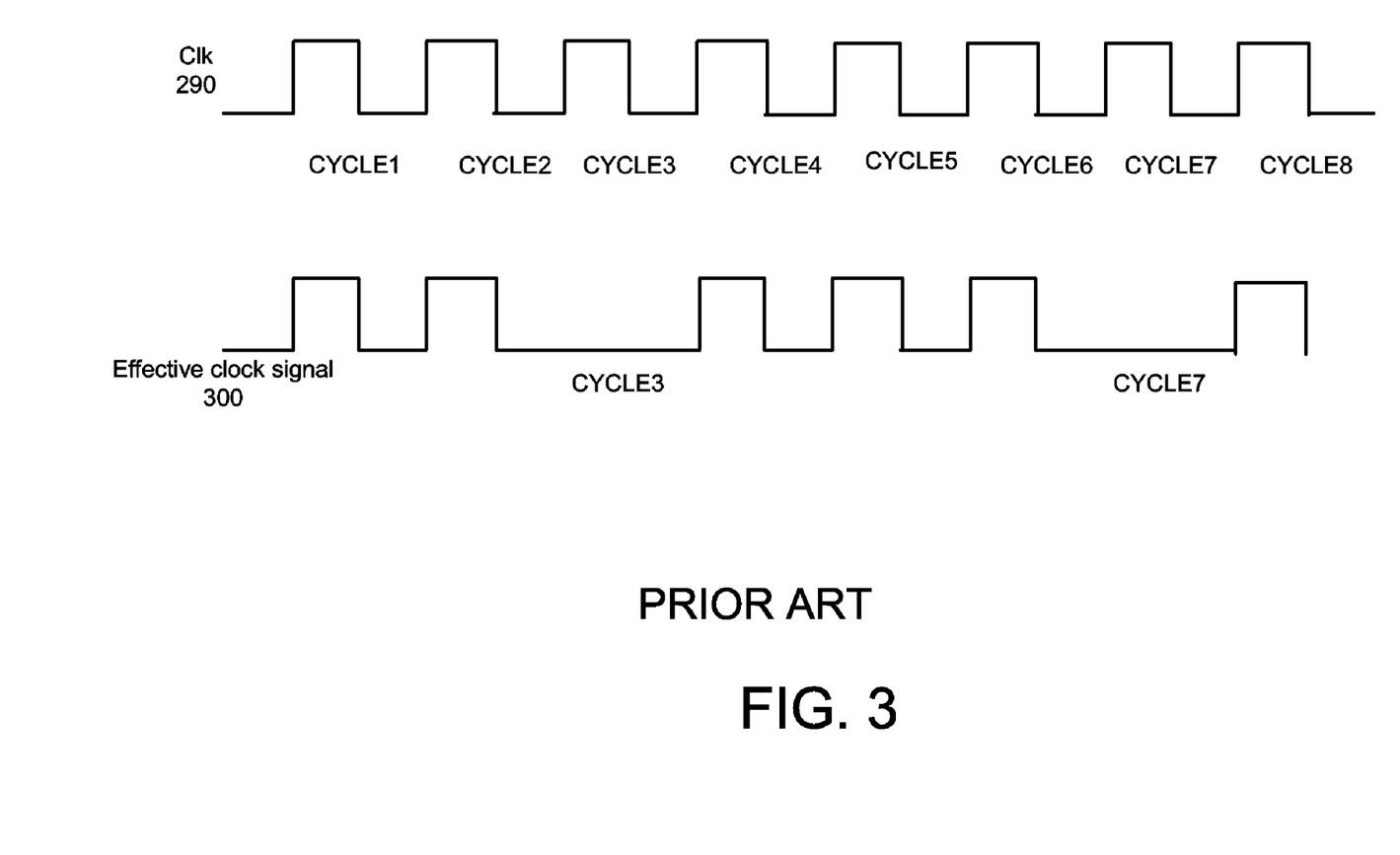
FIG. 3 is a timing diagram of a clock signal and an effective clock signal that illustrates loss of one clock cycle due to each error recovery session.

FIG. 3 is a timing diagram of a clock signal and an effective clock signal that illustrates loss of one clock cycle due to each error recovery session. Curve 290 (referred to as Clk 290) eight clock cycles (CYCLE1-CYCLE8) of clock signal Clk 290. Curve 300 (referred to as effective clock signal) illustrates the clock cycles that are used for data processing. At CYCLE3 and CYCLE 7 a clock recovery process occurred, thus these cycle were not used for data processing and accordingly were omitted from curve 300.

There is a growing need to find effective devices and methods for power management.

SUMMARY OF THE PRESENT INVENTION

A device and a method for power management, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

A method (300) for power management is provided. The method (300) includes: providing (310) a clock signal and a supply voltage to at least one component of a device; detecting (330) a timing error; delaying (350) by a fraction of a clock cycle and in response to the detected timing error, a clock signal provided to at least one of the components; and determining (370) a clock signal frequency and a level of the supply voltage in response to a load of at least one component and in response to at least one detected timing error. A device (70) having power management capabilities is provided. The device (70) includes a voltage supply unit (270, 80) adapted to provide a supply voltage to at least one component (72, 74, 76, 78, 81) of the device (70) and a clock signal source (200) adapted to generate a clock signal; a clock signal provider (82) adapted to delay by a fraction of a clock cycle a clock signal provided to the device (70) in response to a detection of a timing error detected by at least one flip flop (110); and a controller (250) adapted to control the voltage supply unit (270) and the clock signal source (200) in response to at least one detected timing error.

Figure 4:
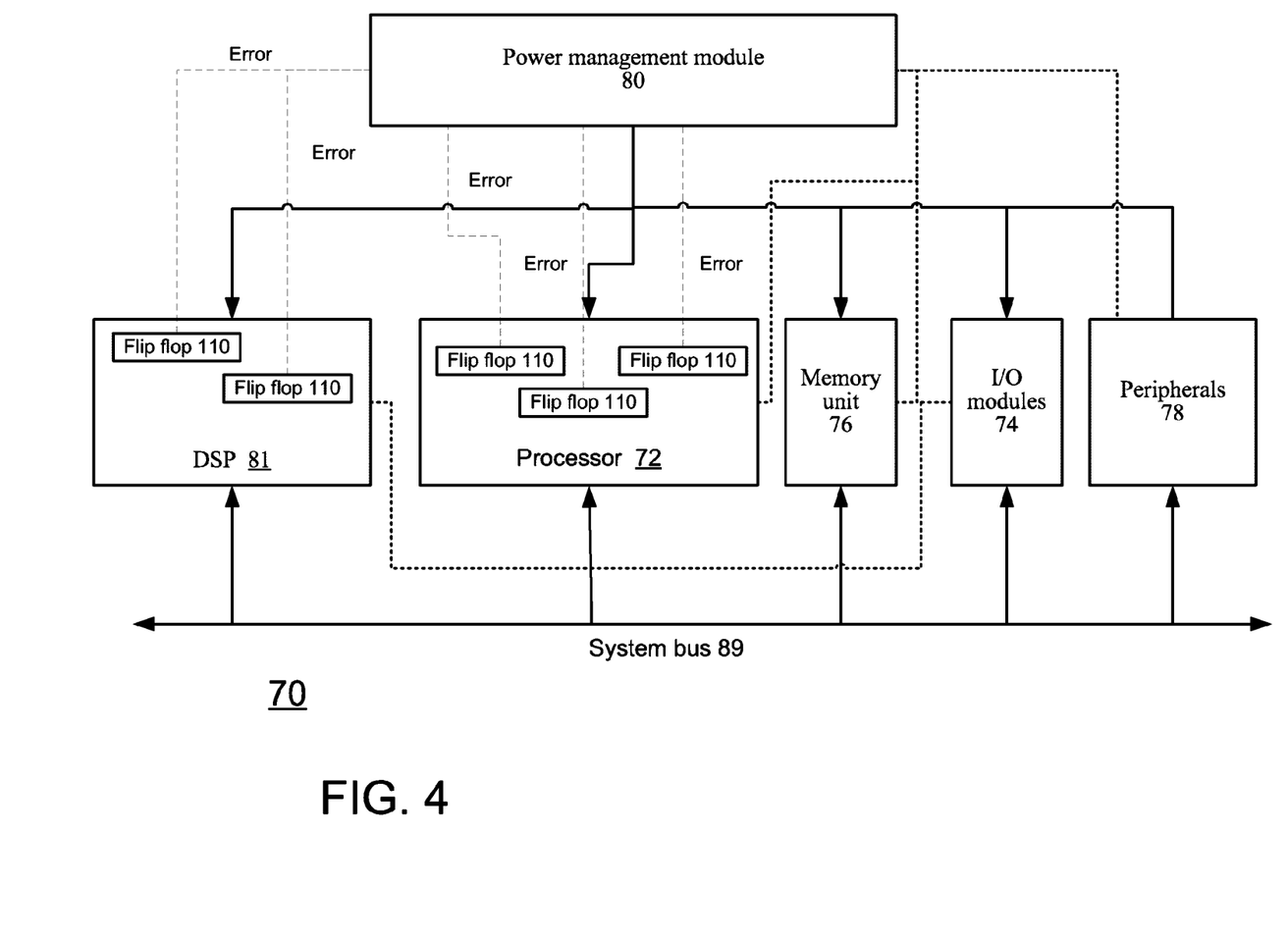
FIG. 4 illustrates a device, according to an embodiment of the invention.

FIG. 4 is a schematic illustration of a device 70 according to an embodiment of the invention. Device 70 may include multiple frequency regions as well as a single frequency region. Each frequency region can include its own error detection and error correction circuits. Typically, multiple flip-flops such as flip-flops 110 having error detection capabilities are used to generate error signals. These error signals can be provided to a power management module 80 that in response can adjust the voltage/frequency supplied to a frequency region. The power management module 80, matches between the voltage level and clock frequency provided to the frequency region by applying matching techniques known in the art. It is noted that the frequency can be matched d to the voltage but the voltage can also be matched to the frequency.

Device 70 includes various units such as but not limited to general-purpose processor 72, I/O module 74, memory unit 76, peripheral 78, and digital signal processor (DSP) 81. These units are linked to each other by various lines and buses and receive clock signals and power supply from one or more sources, illustrated by power management module 80. It is noted that device 70 can include other units, that some of these unit are optional and that device 70 can include multiple units of the same kind. The power management module 80 can include one or more power management modules, one or more clock signal sources, one or more voltage supply sources and the like. Conveniently, a pair of clock signal source and a voltage source are connected to a synchronizer that synchronizes the increment (or decrement) of the voltage level and the clock signal frequency, such as to prevent a case in which the voltage supplied to one or more units is too low to support the clock frequency of the clock signal. This matching is usually useful when altering the operational mode of the integrated circuit and applying Dynamic Voltage and Frequency Scaling techniques. It is noted that the alteration of the voltage/frequency can involve applying error rate based techniques as well as DVFS techniques. For example, an initial voltage/frequency level can be set by applying DVFS and can be altered by applying error based techniques. Device 70 can set the voltage/frequency in response to error indication as well as to its operational mode and load indications from various components of device 70.

Typically, device 70 includes multiple busses and lines and the various units of device 70 can be connected to the same bus, but this is not necessarily so. For convenience of explanation FIG. 4 illustrates a system bus 89 that is shared by units 72, 74, 76, 78 and 81.

It is noted that device 70 can have various configurations and that the units illustrated in FIG. 4 represent only a single exemplary configuration of a device that applies the power reduction technique. Typically, device 70 can be a mobile device such as a cellular phone, a music player, a video player, a personal data accessory, and the like.

Modern cores such as processor 72 and DSP 81 can include millions of transistors. Device 70, or at least some of its units (such as but not limited to processor 72 and DSP 81) can operate in various operational modes, including low power modes such as but not limited to an idle (also being referred to a shut down or standby) mode. During an idle mode it is desired to reduce the power consumption of a device, especially in view of the low computational load imposed on said device during the idle mode.

It is noted that the power management module 80 can tolerate certain error rates before increasing the voltage/frequency. The tolerated error rates can be determined in view of a timing penalty imposed due to the errors and in view of power consumption factors.

It is noted that flip-flops 100 can also located within components that differ from processor 72 and DSP 81.

Figure 5:
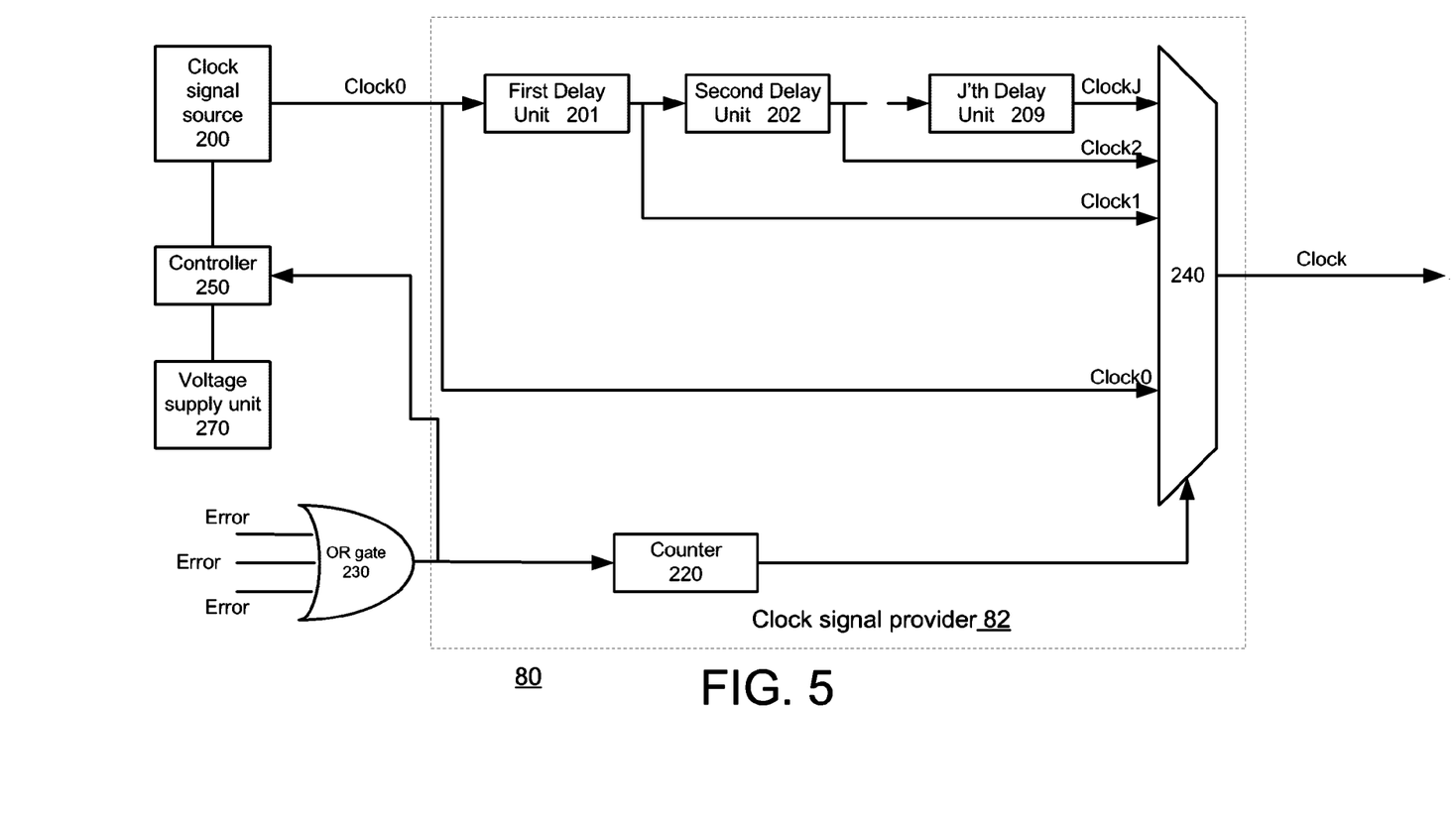
FIG. 5 illustrates a power management module, according to an embodiment of the invention.

FIG. 5 illustrates power management module 80 according to an embodiment of the invention.

Power management module 80 includes a controller 250 adapted to determine the voltage/frequency supplied to one or more frequency regions of device 70, in response to load indications and/or error indications.

Controller 250 is connected to voltage supply unit 270 and to clock signal provider 82. For simplicity of explanation clock source 200 and load indications provided from various components to controller 250 are not shown. The clock signal generator 82 receives a clock signal Clock0 from clock signal source 200 and also receives an error indicator from OR gate 230 and provide a clock signal that may substantially equal clock0 or may be delayed in relation to clock0. Clock signal generator 82 can generate multiple different delayed clock signals (Clock1-ClockJ) and then select between the clock0-ClockJ. A new clock signal is selected whenever an error is detected. The inventors used ten delay units that provided ten delayed clock signals, spaced apart by a delay of about 10% of the clock cycle. It is noted that other delay periods can be provided. By delaying the clock cycle once an error occurs many timing errors can be prevented, as the effective propagation period is slightly expanded. Conveniently, an increment of 10% of the effective propagation period (during error recovery) reduces the error rate by a ration of about 1:10. Conveniently, Clock1-ClockJ are delayed by delay periods Delay1, Delay2, . . . , DelayJ, wherein the Delay1< Delay2< . . . <DelayJ.

Error signals (Error) provided from flip-flops 100 arrive to OR gate 230. If a single error occurs the OR gate 230 outputs a generate error detection signal that is provided to counter 220 that in turn alters the select signal it provides to multiplexer 240. Multiplexer 240 receives a non-delayed clock signal (Clock0) from clock signal source 200 and in addition receives J delayed clock signals (J being a positive integer) Clock1-ClockJ from delay units 201-209 and selects one clock signal to be provided to device 70. Counter 220 rolls over when it reaches to (J+1) so that when the (J+1)'Th error occurs the non-delayed clock signal is provided to device 70. Accordingly, a single clock cycle is required to amend (J+1) errors.

It is noted that other clock signal generators can be provided, including clock signal generators that have a variable delay unit, but this is not necessarily so.

Figure 6:
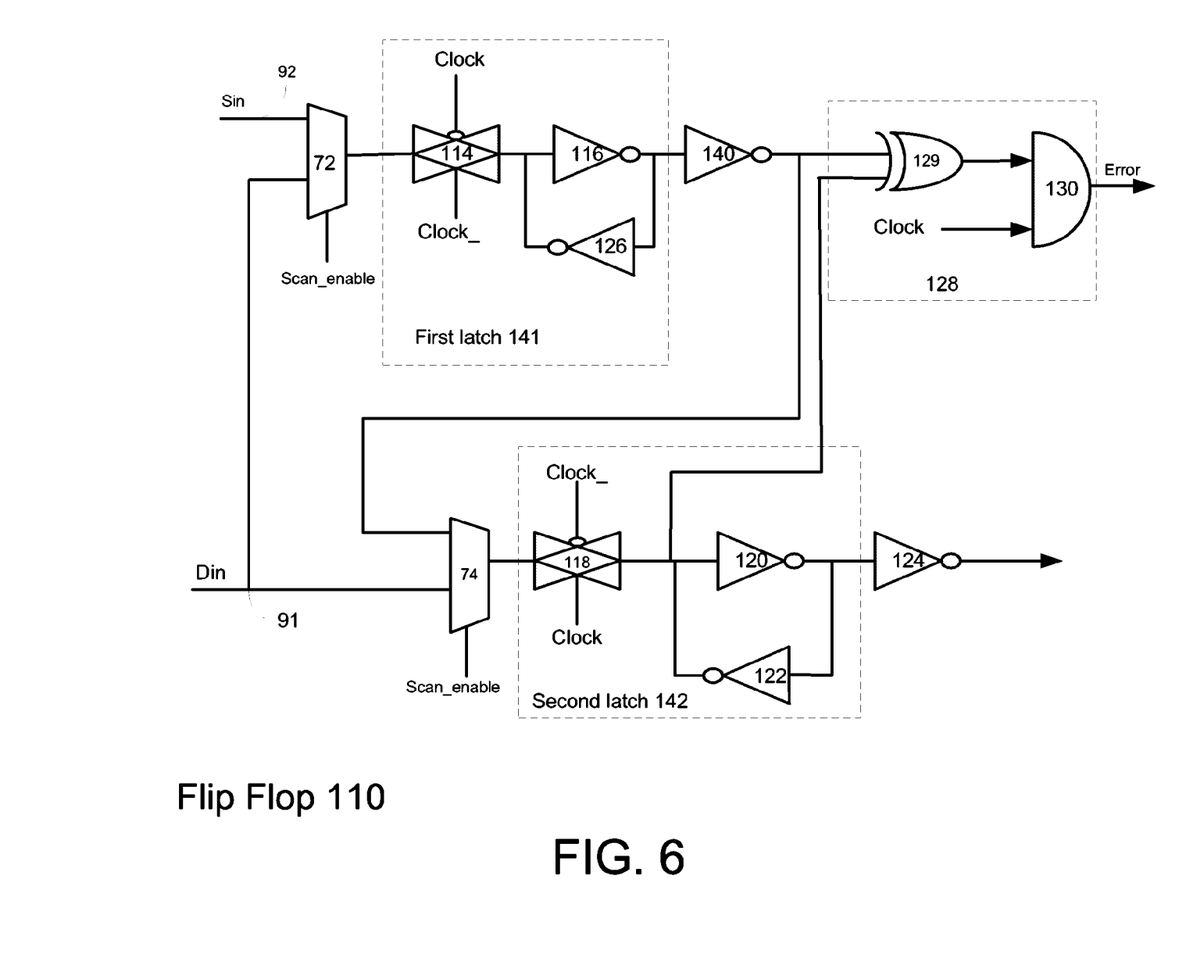
FIG. 6 illustrates a flip-flop, according to an embodiment of the invention.

FIG. 6 illustrates a flip-flop 110 according to an embodiment of the invention.

Flip-flop 110 includes a first input node 91 adapted to receive input data (Din) during a first operational mode of device (70) and a second input node 92 adapted to receive another input data (such as scan mode input data Sin) during a second operational mode of device 70. First input node 91 is connected to a first input of first multiplexer 72 and to a first input of second multiplexer 74. A second input of first multiplexer 72 is connected to second input node 92. A second input of second multiplexer 74 is connected to an output of output inverter 140.

An output of first multiplexer 72 is connected to first latch 141 that includes a first transfer gate 114 followed by a pair of inversely connected inverters 116 and 126. The output of inverter 116 is connected to output inverter 140. The output of output inverter 140 is also connected to a first input of comparator 128. The output of comparator 129 is connected to AND gate 130 that also receives Clock at its other input, so that to ignore comparisons made by comparator 128 during the low clock phase. Thus, changes in the input data occurring during the low clock phase (and result in a difference between the input data to the data latched in first latch 141) do not generate an error signal.

An output of second multiplexer 74 is connected to second latch 142 that includes a second transfer gate 118 that is followed by a pair of inversely connected inverters 120 and 122. The output of inverter 120 is connected to inverter 124. The output of second transfer gate 118 is also connected to a second input of comparator 128.

First transfer gate 114 is clocked by a clock signal (Clock) and second transfer gate 118 is clocked by an inverted clock signal (Clock_inv). Accordingly, first latch 141 latches data at the rising edge of Clock and second latch 142 latches data at the falling edge of Clock.

Conveniently, when device 70 operates at a first operational mode (such as a normal operational mode) the data signal (Din) is provided to first and second latch. Din passes directly to second latch 142 that is open during the low clock phase of Clock. Changes of input data Din during the high clock phase of a certain clock cycle are detected by the comparison between the data latched in second latch 142 (reflecting the value of data signal during a previous clock cycle) and the data that is outputted from output inverter 140. These differences are generated immediately (once the input data changes) thus allowing longer error signal propagation periods.

During a second operational mode, such as during scan mode, the input data passes through the first latch and just then passes through the second latch. In this operational mode the operational frequency can be relatively low and timing violations can be less relevant.

Figure 7:
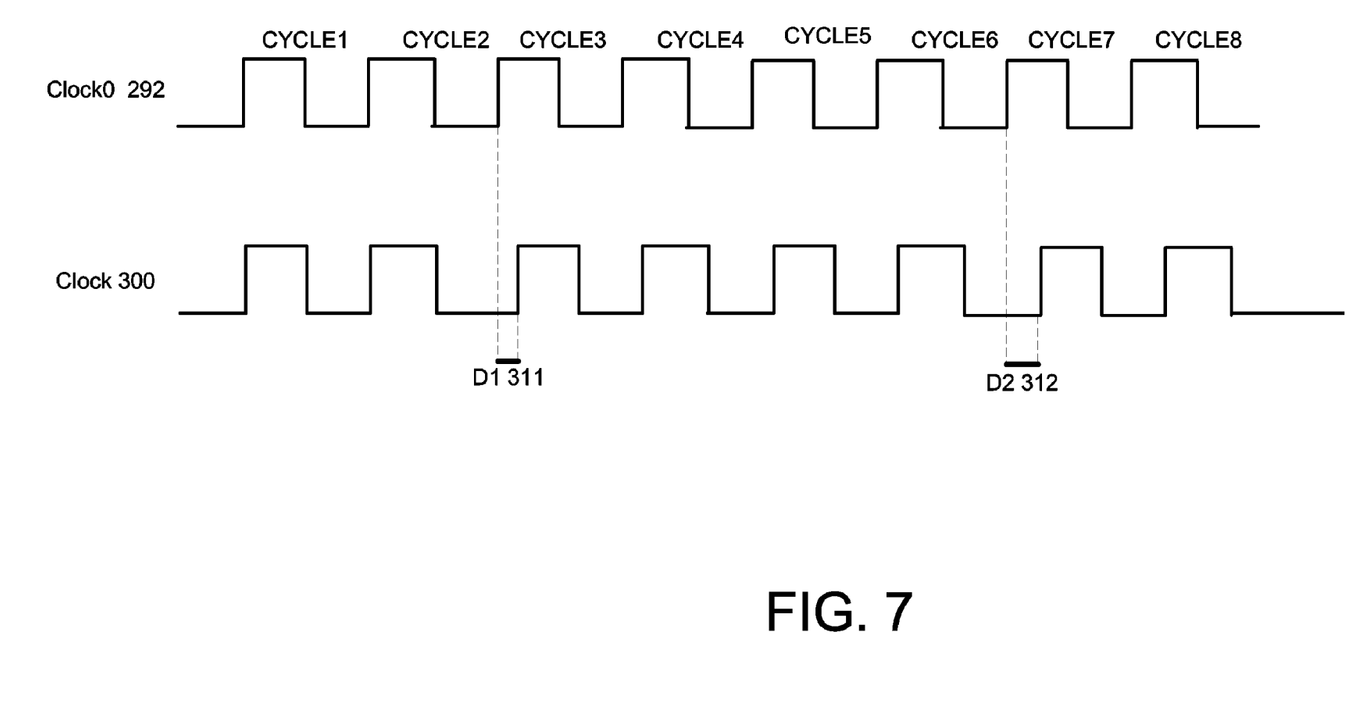
FIG. 7 is a timing diagram of clock signals, according to an embodiment of the invention.

FIG. 7 is a timing diagram illustrating clock signals according to an embodiment of the invention.

Curve 292 illustrates a clock signal Clock0 generated by clock signal source 200. It is assumed that at CYCLE1 of Clock0 the clock signal generator 80 selects to provide Clock0 to flip-flop 100. In other words during CYCLE1 and CYCLE2 Clock equals Clock0.

Curve 300 illustrates clock signal Clock. At CYCLE2 an error was detected as in response the power management module 80 selects to provide Clock1 during CYCLE3-CYCLE6. Clock1 is delayed by D1 311 thus during CUCLE 3 an effective clock cycle of (CYELE0+D1) is provided. At CYCLE6 another error is detected and power management module 80 selected Clock2. Clock2 is delayed by delay period D2 312 in relation to Clock0. During CYCLE7 and CYCLE8 clock signal Clock2 is provided to flip-flop 100.

Figure 8:
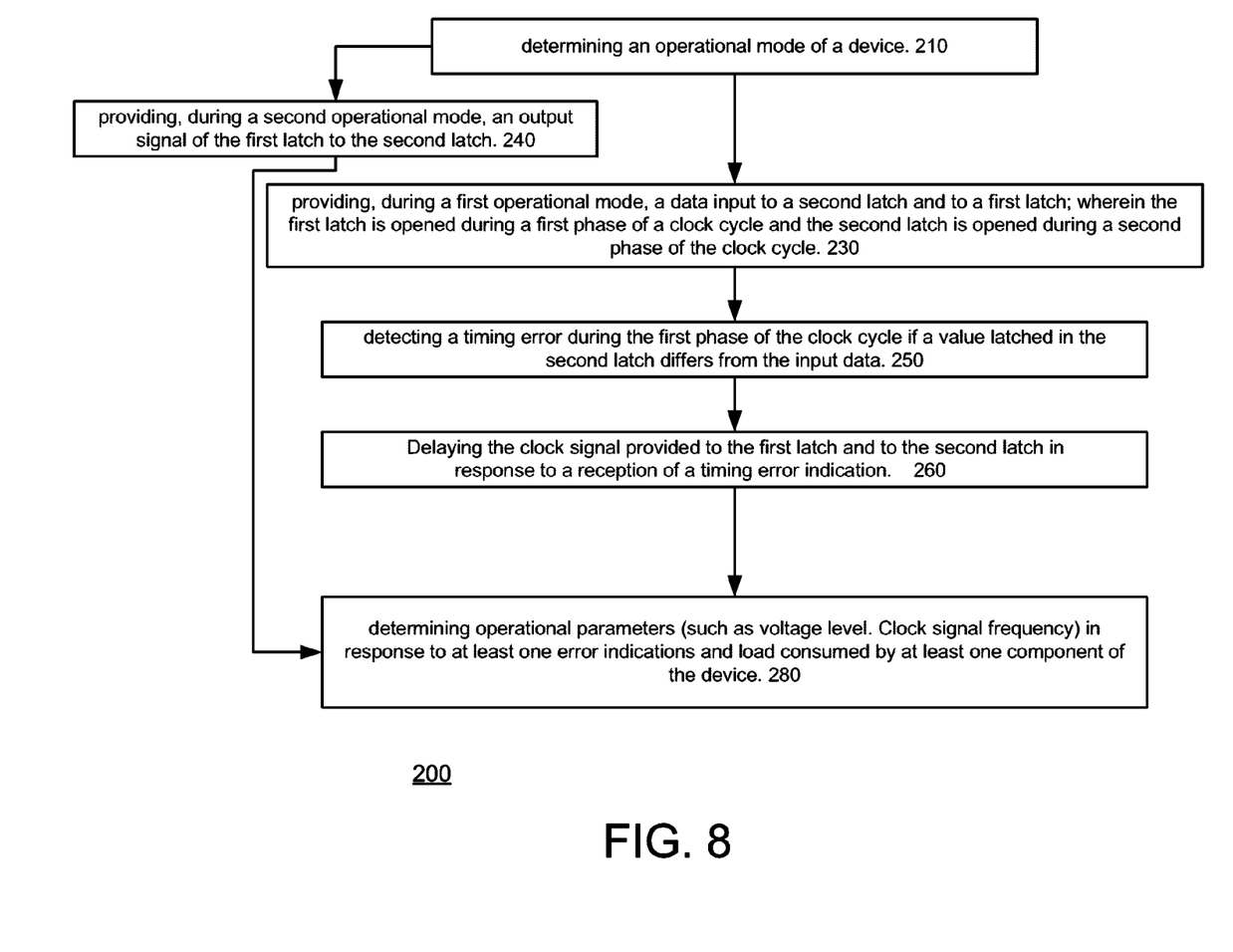
FIG. 8 is a flow chart of a method for power management, according to various embodiments of the invention.

FIG. 8 is a flow chart of method 200 for power management according to an embodiment of the invention.

Method 200 starts by stage 210 of determining an operational mode of a device. The operational modes can include a normal operational mode and a scan operational mode. It is noted that various low power modes can be referred to as examples of the first operational mode.

If a first operational mode is selected then stage 210 is followed by stage 230, else stage 210 is followed by stage 240.

Stage 230 includes providing, during a first operational mode, a data input to a second latch and to a first latch. The first latch is opened during a first clock phase and the second latch is opened during a second clock phase. They can be opened by different clocks. The first clock phase can differ from the second clock phase, can at least partially overlap the second clock phase and the like. Conveniently the first clock phase is the high clock phase while the second clock phase is the low clock phase but this is not necessarily so. Typically transfer gate control when the latches are open (conducting, transparent) and when they are closed (non-conducting, blocking).

Stage 230 is followed by stage 250 of detecting a timing error during the first clock phase if a value latched in the second latch differs from the input data.

Stage 240 includes providing, during a second operational mode, an output signal of the first latch to the second latch. This second operational mode can be a scan mode but this is not necessarily so. The second operational mode is characterized by input data changes that can occur during the first clock phase, without being regarded as resulting from timing errors.

Stage 250 and optionally stage 240 are followed by stage 280 of determining operational parameters (such as voltage level and/or clock signal frequency) in response to at least one error indication and/or load consumed by (or expected to be consumed by) at least one component of the device.

Conveniently, stage 250 includes detecting errors during the high clock phase while ignoring differences between the input data and the second latch output signal during a second clock phase.

Conveniently, stage 250 includes immediately detecting a timing error. Referring to the flip-flop illustrated in FIG. 6, once input data changes (during the first clock phase) the comparison between the input data and the second latch output signal immediately indicates that an error occurs. This is contrary to the error detection of flip-flops 11 and 10 in which the comparison occurs after the first clock phase ends.

Conveniently, stage 250 includes performing a logical OR operations on multiple error signals provided from pairs of first and second latched.

Conveniently, stage 250 is followed by stage 260 of delaying the clock signal provided to the first latch and to the second latch in response to a reception of a timing error indication.

Conveniently, stage 260 includes delaying the clock signal by about 10% of the clock cycle.

Figure 9:
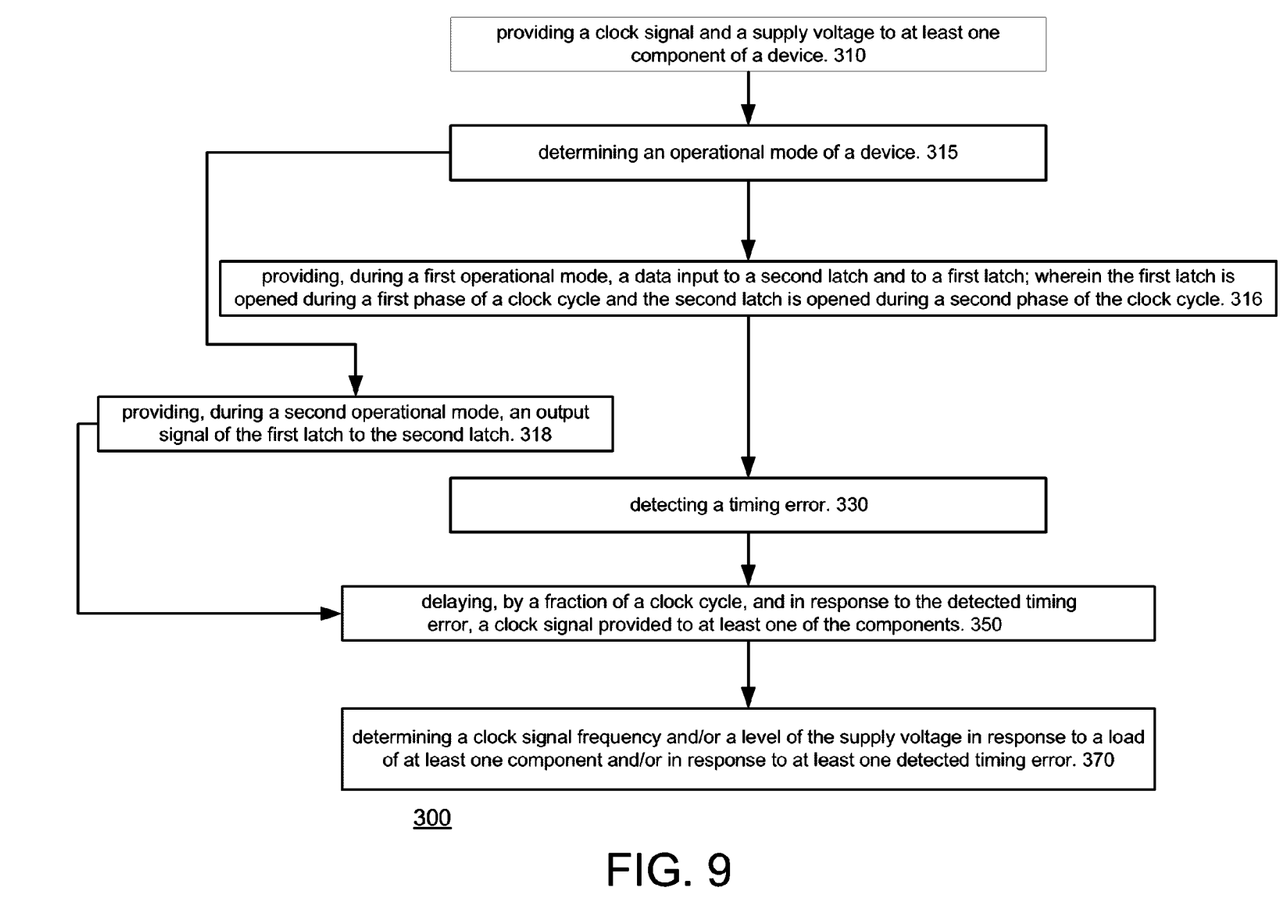
FIG. 9 is a flow chart of a method for power management, according to various embodiments of the invention.

FIG. 9 is a flow chart of method 300 for power management according to an embodiment of the invention.

Method 300 starts by stage 310 of providing a clock signal and a supply voltage to at least one component of a device. Stage 310 is followed by stage 330 of detecting 330 a timing error.

Conveniently, stage 330 of detecting includes detecting a timing error only during a first operational mode of the device.

Stage 330 is followed by stage 350 of delaying, by a fraction of a clock cycle, and in response to the detected timing error, a clock signal provided to at least one of the components. The fraction can be substantially equal to 10% but this is not necessarily so.

Stage 350 is followed by stage 370 of determining a clock signal frequency and/or a level of the supply voltage in response to at least one detected timing error.

Conveniently, stage 350 of delaying includes generating multiple delayed versions of a clock signal and selecting between the delayed versions.

According to an embodiment of the invention method 300 also includes stage 315 of determining an operational mode of a device. If a first operational mode is selected then stage 315 is followed by stage 316, else it is followed by stage 318. Stage 316 includes providing, during a first operational mode, a data input to a second latch and to a first latch. The first latch is opened during a first phase of a clock cycle and the second latch is opened during a first phase of the clock cycle. Stage 318 includes providing, during a second operational mode, an output signal of the first latch to the second latch.

If method 300 includes stages 315-318 then stage 330 of detecting can include detecting a timing error during the first clock phase if a value latched in the second latch differs from the input data. Conveniently, stage 330 of detecting may include at least one of the following: (i) detecting during a high clock phase, (ii) immediately detecting a timing error, (iii) performing a logical OR operations on multiple error signals provided from pairs of first and second latches.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A device having power management capabilities, the device comprises:
   a voltage supply unit adapted to provide a supply voltage to at least one component of the device and a clock signal source adapted to generate a clock signal for provision to a first latch;
   a clock signal provider coupled to the clock signal source and adapted to delay by a fraction of a clock cycle the clock signal in response to a detection of a timing error detected at the first latch; and
   a controller coupled to the voltage supply unit and the clock signal source adapted to control the voltage supply unit and the clock signal source in response to the detection of the timing error.

2. The device according to claim 1 wherein the clock signal provider is adapted to alter a delay period by substantially 10% of the clock cycle in response to a detection of a timing error.

3. The device according to claim 1 wherein the clock signal provider comprises multiple delay units and a multiplexer adapted to select a clock signal in response to a control signal provided by a counter that counts timing errors.

4. The device according to claim 1 further comprising:
   a first input node adapted to receive input data;
   a second latch, a comparator, a first multiplexer and a second multiplexer;
   wherein the second multiplexer is adapted to provide input data to the second latch from the first input mode during a first operational mode of the device and to provide a first latch output signal to the second latch during a second operational mode;
   wherein the comparator is adapted to compare, during a first clock phase, between the first latch output signal and between a second latch output signal and in response to the comparison selectively generate an error signal.

5. The device according to claim 4 further comprising a second input node adapted to receive input data during the second operational mode.

6. The device according to claim 4 wherein the first latch is open during high clock phases and wherein the second latch is open during low clock phases.

7. The device according to claim 4 wherein the comparator is adapted to compare between second latch output signal representative of input data during a second portion of previous clock cycle and between first latch output signal representative of input data during a first portion of a current clock cycle.

8. The device according to claim 4 wherein the device is adapted to generate an error indication immediately upon an occurrence of a timing error.

9. The device according to claim 4 wherein the second latch is adapted to provide, during a first clock phase of a clock cycle occurring after an error was detected, a second latch output signal representative of the input signal the second latch received during the second phase of a clock cycle during which the error was detected.

10. The device according to claim 4 wherein the device is adapted to alter a clock signal provided to at least one component of the device only during a first operational mode of device.

11. A method for power management, the method comprises:
    providing a clock signal and a supply voltage to a first latch of a device;
    detecting a timing error;
    delaying the clock signal by a fraction of a clock cycle and in response to the detected timing error; and
    determining a clock signal frequency and a level of the supply voltage in response to at least one detected timing error.

12. The method according to claim 11 wherein the delaying comprises delaying by substantially 10% of the clock cycle.

13. The method according to claim 11 wherein delaying comprises generating multiple delayed versions of a clock signal and selecting between the delayed versions.

14. The method according to claim 11 wherein the detecting comprises detecting a timing error only during a first operational mode of the device.

15. The method according to claim 11 further comprising:
    determining an operational mode of a device;
    providing, during a first operational mode, a data input to the first latch and a second latch;
    wherein the first latch is opened during a second phase of a clock cycle and the second latch is opened during a first phase of the clock cycle;
    providing, during a second operational mode, an output signal of the first latch to the second latch; and
    wherein the detecting comprises detecting a timing error during the first phase of the clock cycle if a value latched in the second latch differs from the input data.

16. The method according to claim 15 wherein the detecting comprises detecting during a high clock phase of the clock signal.

17. The method according to claim 15 wherein the detecting comprises immediately detecting a timing error.

18. The method according to claim 11 wherein the detecting comprises performing a logical OR operations on multiple error signals provided from pairs of first and second latches.

19. The method according to claim 12 wherein delaying comprises generating multiple delayed versions of a clock signal and selecting between the delayed versions.

20. The method according to claim 12 wherein the detecting comprises detecting a timing error only during a first operational mode of the device.

* * * * *